Aug. 12, 1952   L. F. MAUS   2,606,559
STALK FEEDING MECHANISM
Filed Oct. 1, 1947   4 Sheets-Sheet 3
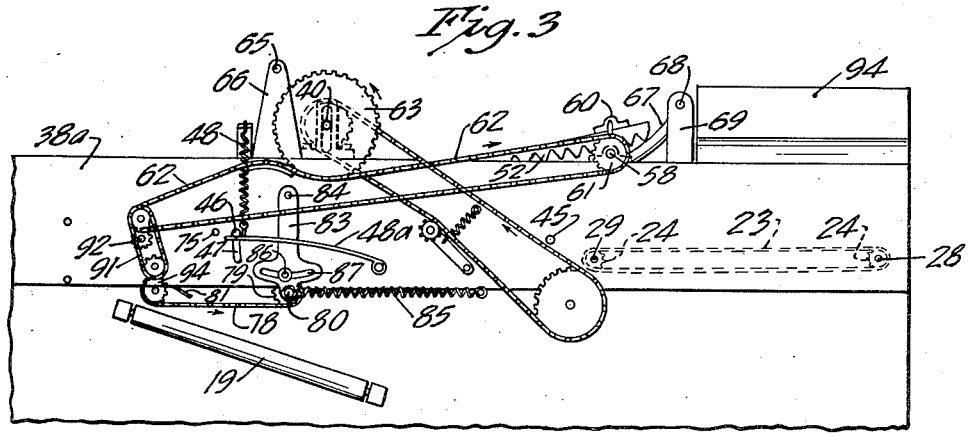
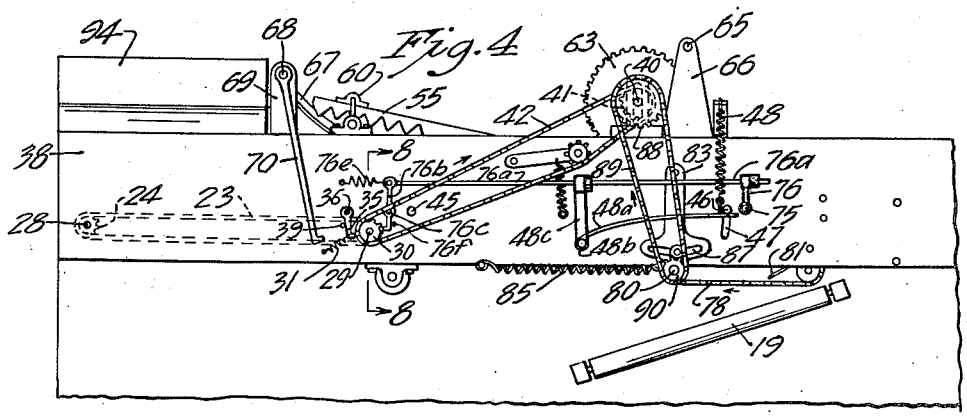
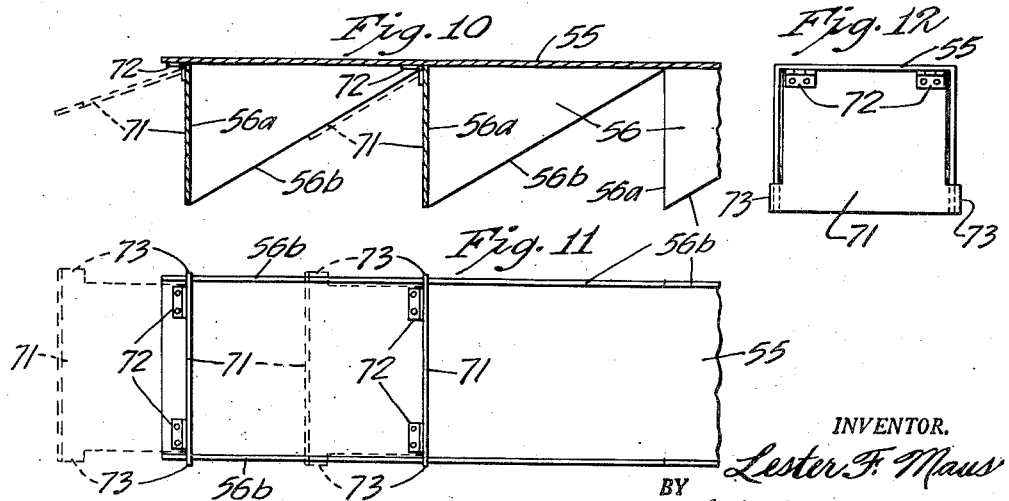
INVENTOR.
Lester F. Maus
BY
John E. Stryker
ATTORNEY

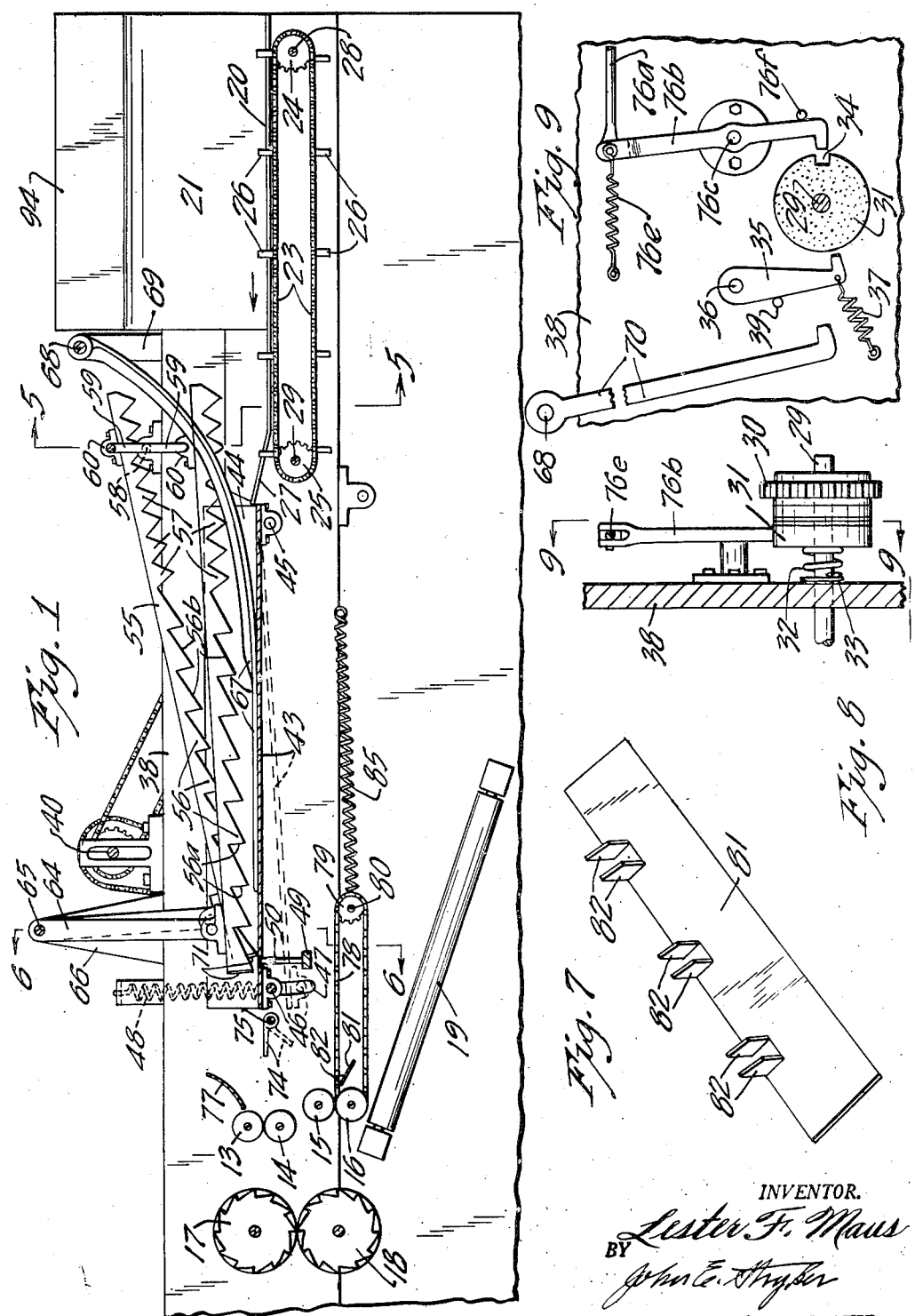

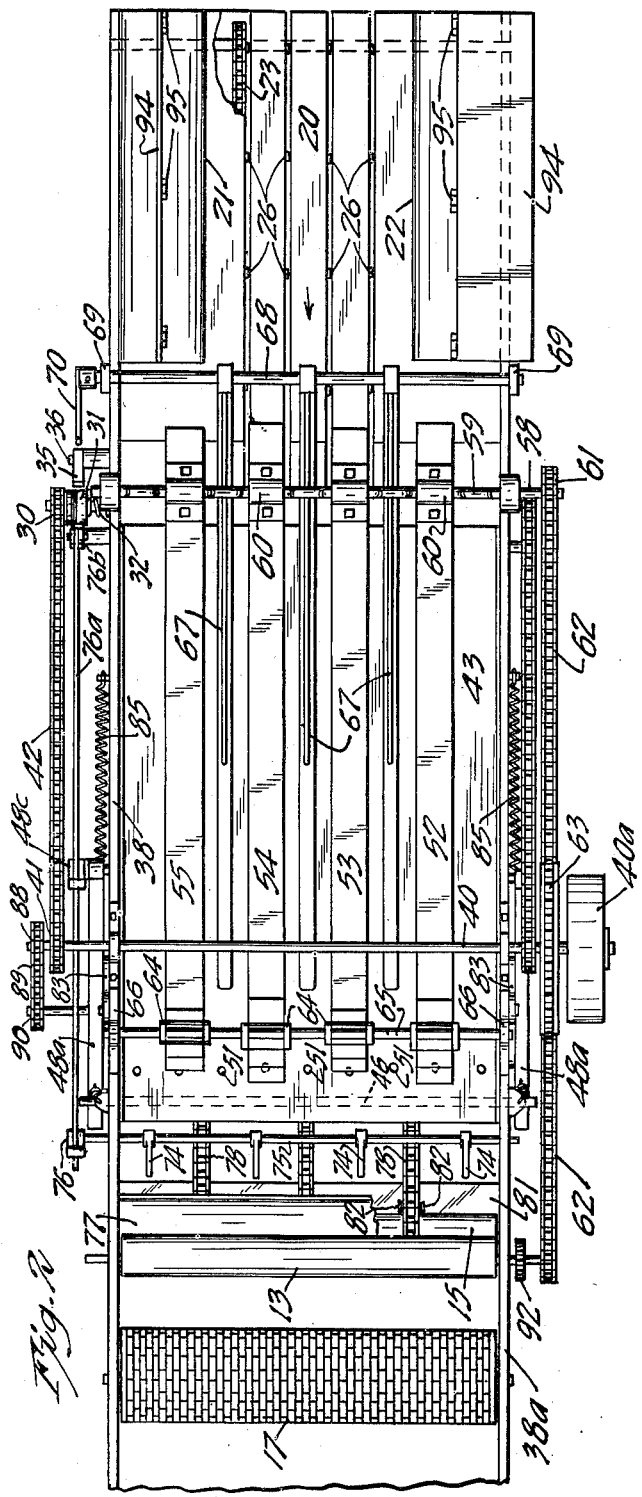

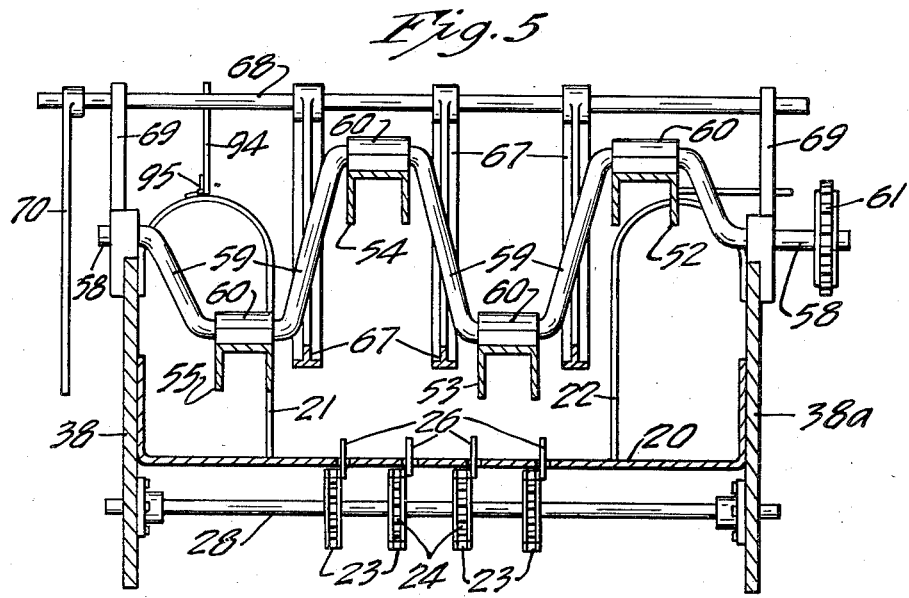

Patented Aug. 12, 1952

2,606,559

UNITED STATES PATENT OFFICE 2,606,559

STALK FEEDING MECHANISM

Lester F. Maus, Minnesota City, Minn.

Application October 1, 1947, Serial No. 777,181

6 Claims. (Cl. 130—33)

This invention relates to stalk feeding mechanism which is particularly, although not exclusively, adapted to feed corn stalks automatically, rapidly and under control to mechanism adapted to separate the ears of corn from the stalks and to husk the ears and shred the stalks or to perform one or more of such processing operations in timed relation to the feeding mechanism.

Heretofore the automatic feeders of this class have not been entirely satisfactory because of the difficulties attendant upon hand feeding of the stalks to the feeders at the uniform rate required by the latter for continuous operation and also because ordinary feeders are subject to clogging, jamming and breakage when overloaded or when fed at a variable rate or with bundles of various sizes, or when the stalks are excessively dry or wet. Consequently, the operation of conventional feeders has been subject to frequent interruptions and delays resulting from overloading and clogging, necessitating much hand work in clearing the machines of obstructing stalks and ears and in making repairs when the clogging or jamming results in damage to the machine.

It is an object of the present invention to provide high speed corn stalk feeding mechanism having effective safeguards against overloading, clogging and jamming as well as damage to the machine resulting therefrom.

A further object is to provide a machine of the class described with mechanism adapted to automatically compensate for variations in the condition of the stalks, as well as variations in the sizes of the bundles fed to it and rate of feeding, thereby minimizing the skill required to properly feed the bundles to the machine and substantially eliminating interruptions in operation due to overloading and clogging and for repairs.

Another object is to provide mechanism of the class described which is adapted to receive corn stalks from a trough in which bundles of them are deposited and to deliver the stalks continuously, rapidly and substantially at a uniform or controlled rate to pairs of snapping rolls or to other power-actuated processing mechanism.

The invention also includes certain other novel features of construction which will be more fully pointed out in the following specification and claims.

In the accompanying drawings a preferred embodiment of my invention is shown by way of example and not for the purpose of limitation.

Referring to the drawings:

Figure 1 is a longitudinal section through a machine embodying my improved feeding mechanism and showing snapping rolls and shredding and husking mechanism diagrammatically;

Fig. 2 is a plan view of my improved feeding mechanism together with the snapping rolls and with portions broken away to show parts otherwise concealed;

Fig. 3 is a side elevational view showing the left side of the machine;

Fig. 4 is a side elevational view showing the right side thereof;

Fig. 5 is a cross section through the feeding mechanism taken approximately on the line 5—5 of Fig. 1;

Fig. 6 is a cross section taken approximately on the line 6—6 of Fig. 1;

Fig. 7 is a perspective view showing in detail the guard fingers and supporting guard plate for preventing the jamming of ears of corn between the lower snapping rolls;

Fig. 8 is a fragmentary section taken approximately on the line 8—8 of Fig. 4;

Fig. 9 is a fragmentary section taken on the line 9—9 of Fig. 8;

Fig. 10 is a longitudinal vertical sectional view through the delivery end portion of one of the feed bars;

Fig. 11 is a bottom plan view of the portion of the feed bar shown in Fig. 10, and Fig. 12 is an end view of the same.

My improved feeding mechanism is illustrated in operative relation to a corn husking and shredding machine which is shown diagrammatically as having an upper pair of snapping rolls indicated by the numerals 13—14, a lower pair of snapping rolls 15—16, rotary shredding knives 17—18 and inclined husking rolls 19. Snapping, shredding and husking mechanisms are well known in the art and the details thereof are not illustrated and described herein because they form no part of the present invention. The corn stalks are usually fed, butt end first, into the bight of the snapping rolls so that the upper layer of stalks is received between the snapping rolls 13 and 14 and the lower layers between the rolls 15 and 16. The ears of corn are broken loose from the stalks as the latter pass between the snapping rolls of each pair and the ears fall at the receiving side thereof and are caught on the husking rolls 19 below. The stalks are fed at high speed by the snapping rolls to the shredding knives 17 and 18, all in a manner well known in this art.

Corn stalks or bundles of them, bound by twine, are fed by hand to a trough having a floor 20 extending substantially horizontally and parallel side walls 21 and 22. This trough is open at its ends and is sufficiently wide to receive one or more bundles of stalks, extending longitudinally in the trough. A plurality of endless feed chains 23 are trained on sprocket wheels 24 and 25 beneath the trough floor 20 and projecting at intervals from these chains are fingers 26 adapted to engage the stalks and move them along the trough in the direction indicated by arrows in Figs. 1 and 2. These fingers are preferably formed from heavy gauge sheet metal and are fixed to the chains to move edgewise and to project above the floor 20 approximately two inches. The upper reaches of the chains 23 are actuated along and closely adjacent to the bottom surface of the floor through narrow, longitudinally extending openings formed therein. At its forward or delivery end the floor 20 is formed with an inclined portion 27 which rises above the sprocket wheels 25 and is adapted to remove the corn stalks and detached "straw" therefrom out of engagement with the several fingers 26 as the latter approach the forward end of the upper reaches of the chains 23, thereby preventing accumulations of straw from interfering with continuous operation of the feed chains.

A horizontally extending idler shaft 28 supports the sprocket wheels 24 and a parallel driving shaft 29 supports the sprocket wheels 25 and is keyed or otherwise fastened in driving relation to these wheels. To drive the shaft 29, a sprocket wheel 30 is revoluble on an end thereof and is provided with a friction clutch member 31 which is held in driving engagement with a face of this wheel by a spring 32 (Fig. 8). The spring is confined on the shaft 29 between a collar 33 fixed thereon and the clutch member 31 is keyed to the shaft for limited longitudinal movement thereon relative to the sprocket wheel 30 which is confined against movement along the shaft. The sprocket wheel is thus adapted to rotate on the shaft 29 when the clutch member 31 and shaft 29 are held against rotation. Formed in the periphery of the clutch member 31 is a notch 34 adapted to receive a dog 35 pivoted at 36 on a side wall 38 of the machine. A spring 37 normally retains the dog in retracted position against a stop pin 39. Mechanism for actuating the dog 35 to stop the feed chains 23 in case of an overload of stalks is hereinafter described.

As best shown in Figs. 2, 3 and 4, a main power shaft 40 extends across the top of the machine and is provided with a pulley 40a adapted to be driven by suitable connections with a tractor engine or motor (not shown). A sprocket wheel 41 is fixed on the shaft 40 to drive a chain 42 extending to and trained on the sprocket wheel 30 for driving the feed chains 23.

Extending substantially horizontally from the inclined portion 27 of the floor 20 is a feed table 43 preferably comprising a plane sheet metal plate having vertical flanges 44 (Fig. 6) extending along opposite side edges. Near its end adjacent to the floor 20, the table 43 is pivotally supported on a horizontally extending shaft 45 and the opposite end of this table is supported for substantially vertical oscillating movement on a horizontally extending shaft 46. The ends of the shaft 46 project through substantially vertically elongated slots 47 formed in the side walls 38 and 38a of the machine. Connected to the ends of the shaft 46 adjacent to the outer faces of the walls 38 and 38a are springs 48 for resiliently supporting the table 43. As shown in Figs. 2 and 4, arms 48a are connected at their forward ends to the shaft 46 and are pivotally supported at the respective outer faces of the walls 38 and 38a upon a horizontal shaft 48b. Extending upward from this shaft and rigidly connected to the arm 48a at one side of the machine is an arm 48c adapted to actuate mechanism for stopping the feed chains 23 when the table 43 is depressed under an overload of stalks.

It will be evident that the table 43 is resiliently supported by the springs 48 in predetermined, substantially horizontal position under normal load, these springs permitting the table to be depressed when overloaded with an excessive quantity of stalks.

Extending in parallel relation to the shaft 46 and adjacent thereto is a fixed, rigid bar 49 carrying a multiplicity of upwardly projecting pins 50. Perforations 51 (Fig. 6) are formed in the table 43 and are disposed in a row to receive the pins 50 and to permit these pins to project above the top surface of the table 43 when the latter is depressed against the action of the springs 48. With the table in normally elevated position, the upper ends of the pins 50 are substantially at the elevation of the table top surface.

Mounted above and extending longitudinally of the table 43 is a plurality of stalk feeding bars indicated respectively by the numerals 52, 53, 54 and 55. Each of these bars has a pair of toothed flanges forming feeder teeth 56 extending downward along each side edge thereof to engage the corn stalks from above and feed them from right to left as seen in Figs. 1 and 2. Each of the bars 52—55 is also provided with downwardly projecting cutter teeth 57 for severing the bands binding the corn stalks together in bundles. These teeth 57 have sharpened, saw-like edges and the feeder teeth 56 are of ratchet-like shape, being formed with substantially vertical edges 56a and inclined edges 56b.

To support and actuate the several feeder bars 52—55 above the receiving end of the table 43, a crank shaft 58 is mounted in suitable bearings on the side walls 38, 38a and is formed with cranks 59 engaging the several feeder bars in suitable bearings 60. The shaft 58 has fixed on one end a sprocket wheel 61 adapted to be driven by a chain 62 (Figs. 2 and 3) engaging a sprocket wheel 63 mounted on the power-driven shaft 40. The direction of rotation of the shaft 58 is clockwise as viewed in Fig. 1 and the cranks severally operating alternate bars 52—55 extend in diametrically opposite directions from the axis of the shaft 58 so that two of these bars are actuated in a forward or feeding direction when the other two are moving in the reverse direction.

Pairs of hangers 64 operatively support the several feeder bars 52—55 at their forward or left ends as seen in Figs. 1 and 2. These hanger bars are pivotally connected in pairs to the several feeder bars and are supported at their upper ends on a laterally extending shaft 65 mounted on brackets 66 projecting up from the respective side walls 38, 38a. The hanger bars 64 guide the feeder bars 52—55 so that the forward end portions of the latter oscillate in arcs the length of which is determined by the cranks 59.

A plurality of governor arms 67 are fixed on a horizontally extending shaft 68, this shaft being supported on upwardly projecting brackets 69 fastened to the side walls 38 and 38a of the machine. From the shaft 68 the arms 67 extend obliquely downward and along the table 43 to rest on the stalks as they are fed along the table and to oscillate in substantially vertical planes. The shaft 68 projects outward from the wall 38 and carries on its projecting end a pendant arm 70 (Figs. 2, 4 and 9) which is adapted to actuate the dog 35 for stopping the feed chains 23 when an excessive quantity or overload of stalks reaches the forward part of the table 43. When the stalks are being fed at a normal rate or in proper quantity over the table 43, the arm 70 merely oscillates free of the dog 35. In case the table is overloaded near its forward end, the governor arms 67 are raised sufficiently to actuate the dog 35 to enter the notch 34 in the clutch member 31, thereby stopping the operation of the feed chains 23 until the excess load has been removed by operation of the feeder bars 52—55. When the excess stalks have been removed from the table 43 the governor bars 67 move downward and the dog 35 is withdrawn from the clutch member 31 by the spring 37, thereby permitting resumed operation of the feed chains 23.

To insure positive engagement of the bars 52, 53, 54 and 55 with the stalks near the delivery or forward end of the table 43, each of these feed bars is provided with two or more hinge plates 71 carried by hinges 72 and formed with lugs 73 projecting laterally to engage the substantially vertical edges 56a of the feeder teeth 56. The several hinge plates 71 are free to swing away from the tooth edges 56a, as indicated in broken lines in Fig. 10, during the backward stroke of the feed bar and to return to substantially vertical position, wherein the lugs 73 engage the edges 56a, during the forward or feeding stroke of the feeder bars. During this latter stroke the substantially horizontally extending lower edge of each of the hinge plates 71 is forced obliquely downward in an arc determined by the hanger bars 64 to grip the several stalks beneath, thus positively feeding the stalks from the forward edge of the table 43.

Projecting in continuation of the front end of the feed table 43 is a plurality of fingers 74 (Figs. 1 and 2) which are fixed at their rear ends on a substantially horizontally extending rock shaft 75. This shaft is supported in suitable bearings on the side walls 38 and 38a and projects from the exterior of the wall 38. As shown in Fig. 4, a crank arm 76 is fixed on the projecting end of the shaft 75 to extend upward to a rod 76a extending along the wall 38 to actuate a lever 76b (Fig. 9). The front end of the rod 76a is provided with a fixed collar adapted to be engaged by a forked upper end on the arm 76 and a similar collar is fixed on the rod 76a to be engaged by a forked upper end on the arm 48c so that the feed chain clutch may be actuated independently by either arm 76 or arm 48c.

The rear end of the rod 76a is connected to a lever 76b which is pivoted on a pin 76c projecting from the wall 38. A dog 76d is formed on the lower end of the lever 76b for engagement with the clutch member 31. Connected to the upper end portion of the lever 76b is a coiled spring 76e adapted to normally bias the lever against a stop pin 76f and to retract the dog 76d away from the clutch member 31. The spring 76e also functions to bias the fingers 74 to normal, substantially horizontal positions.

In the event that an excessive number of corn stalks tends to pass downward from the delivery end of the table 43 toward the lower snapping rolls 15 and 16, the weight of the stalks will actuate the forward ends of the fingers 74 downward thereby rocking the shaft 75 and through the crank arm 76 and rod 76a actuating the clutch lever 76b to stop the feed chains 23.

The upper layers of stalks received from the table 43 are directed into the bight of the upper snapping rolls 13 and 14 by a guide plate 77 which extends obliquely downward across the machine adjacent to the upper roll 13, as shown in Figs. 1 and 2. The lower layers of stalks pass downward along and between the fingers 74 to the snapping rolls 15 and 16. Some of the stalks will extend laterally of the machine or obliquely across the machine. To engage and align such stalks, I provide a plurality of feed chains 78 having upper reaches which extend substantially horizontally into the bight of the snapping rolls 15 and 16, the chains being trained on the lower roll 16 and on sprocket wheels 79 mounted on a horizontally extending shaft 80. The several endless chains 78 extend in spaced parallel relation one to another to allow ears of corn to pass downward between them and are guided in grooves 78a (Fig. 6) formed in the periphery of the snapping roll 16, as more fully described in my Patent No. 2,370,560, granted February 27, 1945. Extending laterally of the machine and between the upper and lower reaches of the several chains 78 is a guard plate 81 (Figs. 1, 6 and 7) having its ends supported respectively on the side walls 38 and 38a of the machine. This plate 81 is inclined longitudinally of the machine and has its upper edge disposed adjacent to the bight of the snapping rolls 15 and 16. Guard fingers 82 are fixed on the plate 81 near its upper edge and are arranged to project upward at the lateral sides of the upper reach of each of the chains 78. The upper edges of the guard fingers 82 are positioned at the normal elevation of the upper surfaces of the chains 78 and the latter are resiliently supported so that they may be forced down below the upper edges of the fingers when an ear of corn becomes caught on a chain. The plate 81 and fingers 82 are thus arranged to deflect ears of corn which are caught directly on the chains out of the bight of the snapping rolls, thereby allowing the ears to fall from the plate 81 between the several chains 78. These chains are provided with spring tensioning means adapted to permit their upper reaches to be depressed below the upper edges of the guard fingers 82. As indicated in Figs. 3 and 4, the shaft 80 carrying the sprocket wheels 79 projects at the outer faces of the wall members 38 and 38a and is journaled in bearings formed in hanger plates 83 adapted to oscillate in vertical planes about pivot pins 84. Coiled springs 85 are operatively connected to the lower ends of the hangers 83 to retain the chains 78 under tension. The hangers 83 are further guided by bolts 86 which slidably engage the hangers 83 in arcuate slots 87 formed therein. The shaft 80 having the sprocket wheels 79 fixed thereon is driven through suitable connections with the power shaft 40 including a sprocket wheel 88 (Fig. 4), a chain 89 and a sprocket wheel 90 fixed on the shaft 80. As indicated in Figs. 3, 5 and 6, the snapping rolls are driven through suitable connection with the power-driven shaft 40 including the chain 62 for operating the upper snapping roll 13 and a chain 91 connecting the roll 13 to the roll 15 of the lower pair. The rolls 13 nad 14 are positively connected together for operation in unison by spur gears 92 and the rolls 15 and 16 are similarly connected together by spur gears 93. The peripheral speed of the several snapping rolls is somewhat higher than the lineal speed of the feed chains 78 so that the snapping rolls are caused to remove the stalks rapidly while the ears, after being broken loose from the stalks, fall between the chains 78 to the husking rolls 19.

To facilitate feeding stalks manually to the trough at the receiving or rear end of the machine, bang boards 94 are provided upon the upper surfaces of the trough walls 21 and 22 as indicated in Figs. 1, 2 and 5. These boards are connected to the trough walls by means of hinges 95 and are adapted to be fastened in the vertical position shown at the left of Fig. 5 or placed in horizontal position as shown at the right of Fig. 5, as required. The stalks may be thrown into the trough from either side so as to strike the bang board at the far side when the latter is fastened in vertical position.

Operation

Either loose stalks or bundles of stalks may be fed to the trough formed by the floor 20 and walls 21 and 22. Preferably the butts of the stalks are directed toward the left of the machine as viewed in Figs. 1 and 2. With the machine in operation through the power-driven connections hereinbefor described the fingers 26, projecting substantially above the trough floor 20, engage the stalks or bundles to advance them rapidly to the table 43. As the stalks are raised by the inclined portion 27 of the floor 20 they are disengaged from the fingers 26 and then pass beneath the feeder bars 52—55 having the cutter teeth 57 and feeder teeth 56. The cutter teeth immediately sever the twine bands binding the stalks together in bundles whereupon the oscillating bars 52—55 spread the stalks laterally and evenly in layers upon the table 43, this table being substantially wider than the feed trough, as clearly shown in Figs. 2 and 5. During the downward and forward stroke of the feed bars 52, 53, 54 and 55 the stalks are torn apart, spread and compressed on the table 43 while being moved along the table toward the delivery end thereof by engagement with the substantially vertical edges 56a of the feeder teeth 56. As each feeder bar reaches the end of its forward or feed stroke, its rear end portion is raised by its actuating crank 59 and the stalks are disengaged from this bar while a bar moving in the forward direction continues the feeding motion. Upon arriving near the delivery end of the table 43, the stalks are engaged by the lower edges of the hinge plates 71 moving in the forward direction. These plates swing forward, as indicated in broken lines in Figs. 10 and 11 as the bars oscillate to the rear thereby freeing the stalks and allowing them to continue toward the snapping rolls 13, 14, 15 and 16. The forward or butt ends of the stalks are thereupon fed to the snapping rolls, the upper layers of stalks passing between the rolls 13 and 14 and the lower layers obliquely downward and forward between the rolls 15 and 16. Stalks which extend crosswise or obliquely across the machine as they approach the rolls 15 and 16 are straightened and fed between these rolls by the chains 78 while the ears separated from the stalks fall between these chains to the husking rolls 19. The stalks and leaves are crushed between the snapping rolls and may be shredded by known mechanism such as the shredding knives 17 and 18.

The stalks on the table 43 pass beneath the governor arms 67 thereby oscillating these arms upward to an elevation dependent upon the depth or number of stalks carried beneath the arms. In normal operation, a number of layers of stalks are fed along the table 43 without interrupting the feeding operation. However, in the event that an overload of stalks is fed to the table 43, the arms 76 are raised to a position which causes the clutch operating arm 70 to strike the dog 35 and actuate the latter against its spring bias to engage the clutch member 31 in the notch 34, thereby stopping the feed chains 23. During such interruption of the operation of the feed chains 23, the crank shaft 58 continues to operate the feed bars 52—55 and these bars continue to remove layers of stalks from the top of the table 43. When the depth of the stalks has thus been reduced to normal, the governor arms 67 return to normal position so that the arm 70 is withdrawn from the dog 35 and the spring 37 withdraws this dog from engagement with the clutch member 31, thus allowing the feed chains to resume operation through the friction drive connections described. Further, in case an overload of stalks is allowed to reach the table 43, the increased depth of stalks, crowding between the forward ends of the bars 52—55 and the table top surface, forces the forward end of the table downward against the spring bias of the springs 49 and arms 48a so that the pins 50 project above the table into the path of the lower layers of the stalks. These layers are thereupon retarded and held on the table while the feed bars 52—55 continue to reduce the overload from the top. When the table 43 is depressed the feed chains 23 are also stopped by operation of the arms 48a and 48c which actuate the rod 76a and connections for stopping the clutch member 31 and shaft 29 carrying the sprocket wheels 24. As soon as the abnormally high downward pressure on the table 43 is relieved, the forward end of the table is raised by the springs 49 and thereupon the lower layers of stalks, being free of the retarding pins 50, are fed to the snapping rolls and the arms 48a and 48c are returned to normal position while the clutch member 31 is released to permit operation of the feed chains 23.

Under some conditions, the stalks tend to crowd downward from the delivery end of the feed table 43 at an excessive rate. Should such crowding occur, the forward ends of the fingers 74 will be depressed, thereby rocking the shaft 75 and actuating the clutch lever 76b to engage and stop rotation of the clutch member 31. This interrupts the operation of the feed chains 23 until the overload of stalks in engagement with the fingers 74 is reduced to normal by operation of the feed chains 78 and snapping rolls which continue to operate at the normal or fixed rate.

Occasionally an ear of corn will tend to adhere to a chain 78 where the latter enters the bight of the snapping rolls 15 and 16. In order to free such adhering ears and prevent them from being ground or crushed between the snapping rolls 15 and 16, or from jamming between these rolls, the guard plate 81 and fingers 82 are provided to coact with the spring tensioning means for the chains 78. As hereinbefore pointed out, the upper edges of the several guard fingers 82 extend closely adjacent to the sides of the chains 78 and at the normal elevation of the upper surfaces of these chains. When an ear of corn tends to ride one of the chains 78 into the bight of the snapping rolls 15 and 16, the upper reach of the chain 78 is pressed downward and the several chains are rendered relatively slack by the resulting forced extension of the spring tensioning means comprising the springs 85 and resilient arms 85a. When the upper reach of a chain 78 is pressed downward by an ear of corn, the latter is stopped by the guard fingers 82 as the ear approaches the bight of the rolls 15 and 16 and is thereby disengaged from the chain and allowed to fall from the plate 81 between the chains.

Corn stalks in various conditions, whether green, moist, dry, tough or brittle, may be fed successfully by means of my improved feeding mechanism and with substantially no interruption due to overloading or other accidental causes. The several safeguards and controls hereinbefore described greatly reduce the skill required in the manual feeding of the stalks to the machine and substantially eliminate the difficulties heretofore encountered resulting from overloading, jamming and clogging, while preventing damage to either the feeding mechanism or the processing elements of the machine, including the snapping rolls and power driving mechanism.

Having described my invention, what I claim as new and desire to protect by Letters Patent is:

1. Stalk feeding mechanism comprising, a table adapted to support the stalks, resilient means supporting said table and permitting it to be depressed under an overload of stalks, feeding means mounted above said table and movable obliquely downward and along said table to engage the stalks from above and to compress layers of the stalks on said table, means for actuating said feeding means to move the stalks longitudinally of said table and to compress the stalks thereon and fixed stark retarding means normally positioned below the top surface of said table and adapted to project above the same and in the path of stalks moving over the table when the table is depressed by an overload.

2. Stalk feeding mechanism comprising, a table having a top surface adapted to slidably support the stalks, resilient means supporting said table and permitting it to be depressed under an overload of stalks, feeding means extending above said table and having toothed members projecting downward to engage the stalks, means for actuating said feeding means to move the stalks along and from an end of said table and a series of upwardly projecting members having upper ends normally positioned below the top surface of said table and adapted to project above the same and in the path of stalks moving over the table, whereby when the table is depressed by an overload the lower stalks are retarded on the table while the upper stalks thereon are continuously fed over the table and from the delivery end thereof.

3. Stalk feeding mechanism comprising, a table having a top surface adapted to slidably support the stalks, resilient means supporting said table and permitting it to be depressed under an overload of stalks, a plurality of feeder bars extending above said table and having toothed members projecting downward to engage the stalks, means for actuating said feeder bars to move the stalks along said table, a series of upwardly projecting members having upper ends normally positioned below the top surface of said table and adapted to project above the same and in the path of stalks moving over the table, whereby when the table is depressed by an overload some of the stalks are retarded on the table while others are continuously moved over the table and from the delivery end thereof.

4. Stalk feeding mechanism comprising, a table having a plane, smooth top surface adapted to slidably support the stalks, resilient means supporting said table and permitting it to be depressed under an overload of stalks, a plurality of feeder bars extending obliquely downward and along said table and having toothed members projecting downward to engage the stalks from above, means supporting said bars for oscillating movement downward and along the table, means for actuating said feeder bars to compress the stalks on the table and move them along said table, a series of upwardly projecting members having upper ends normally positioned below the top surface of said table and adapted to project above the same and in the path of stalks moving over the table when the table is depressed by an overload whereby some of the stalks are retarded on the table while others are continuously fed over the table and from the delivery end thereof.

5. In a machine having coacting snapping rolls adapted to receive between them corn stalks and to separate the ears from the stalks, the improvements which comprise, a feed table disposed to receive the stalks and having a delivery end spaced from said rolls, means for feeding stalks to said table, means for moving the stalks on said table toward said rolls, a series of fingers projecting in continuation of said table toward and in spaced relation to the bight of said rolls, resilient means supporting said fingers at a predetermined elevation, a control adapted to interrupt the feeding of stalks to said table and means operatively connecting said fingers to said control so that the feeding of stalks to said table is interrupted when said fingers are depressed by an overload of stalks thereon.

6. In a machine having upper and lower pairs of substantially horizontally extending rolls between which corn stalks may be fed for separating the ears from the stalks, a feed table disposed substantially at the elevation of the upper pair of rolls and with the delivery end of the table spaced from said rolls, power-actuated means for feeding stalks along and from the delivery end of said table toward said rolls, a series of fingers projecting in continuation of said table toward the rolls and in horizontally spaced relation to the bight of both pairs of said rolls, resilient means supporting said fingers at a predetermined elevation, control means for interrupting the operation of said power actuated feeding means and means operatively connecting said fingers to said control means so that the feeding of stalks from said table toward the rolls is interrupted when said fingers are depressed by an overload of stalks thereon.

LESTER F. MAUS.

REFERENCES CITED

The following references are of record in the file of this patent:

UNITED STATES PATENTS

| Number | Name | Date |
|---|---|---|
| 448,957 | Gray | Mar. 24, 1891 |
| 521,674 | Schlatter | June 19, 1894 |
| 594,198 | Kailor et al. | Nov. 5, 1895 |
| 715,418 | Parsons | Dec. 9, 1902 |
| 720,846 | Rich | Feb. 17, 1903 |
| 721,740 | Rains | Mar. 3, 1903 |
| 724,621 | Shedenhelm | Apr. 7, 1903 |
| 724,622 | Shedenhelm | Apr. 7, 1903 |
| 737,598 | Ereckson | Sept. 1, 1903 |
| 764,824 | Ruth | July 29, 1904 |
| 785,496 | Jirsa | Mar. 21, 1905 |
| 824,289 | Dunkelberger | June 26, 1906 |
| 1,033,901 | Jensen | July 30, 1912 |
| 1,256,120 | Fellows | Feb. 12, 1918 |
| 2,370,560 | Maus | Feb. 27, 1945 |